(12) United States Patent
Byrd

(10) Patent No.: US 7,886,478 B1
(45) Date of Patent: Feb. 15, 2011

(54) FISHING DEVICE FOR THE DISABLED

(76) Inventor: Chuck Byrd, 4375 Old Medina Rd., Medina, TN (US) 38355

( * ) Notice: Subject to any disclaimer, the term of this patent is extended or adjusted under 35 U.S.C. 154(b) by 118 days.

(21) Appl. No.: 11/965,465

(22) Filed: Dec. 27, 2007

(51) Int. Cl.
*A01K 89/012* (2006.01)
*A01K 97/10* (2006.01)
*A01K 87/00* (2006.01)

(52) U.S. Cl. .................. 43/21; 43/21.2; 242/225; 242/250

(58) Field of Classification Search ........... 43/21, 43/21.2, 27.4; 242/225, 250
See application file for complete search history.

(56) References Cited

U.S. PATENT DOCUMENTS

| | | | | |
|---|---|---|---|---|
| 2,190,398 | A * | 2/1940 | Bugatti | 43/21 |
| 2,499,117 | A * | 2/1950 | Smith | 43/21.2 |
| 3,036,312 | A * | 5/1962 | Larsen et al. | 43/21.2 |
| 3,049,829 | A * | 8/1962 | Clapp | 43/21 |
| 3,052,424 | A * | 9/1962 | Skraban | 43/21 |
| 3,252,239 | A * | 5/1966 | Moeller | 43/21 |
| 3,438,594 | A * | 4/1969 | Bellefeuille | 43/21 |
| 3,460,778 | A * | 8/1969 | Folbrecht | 242/225 |
| 3,463,415 | A * | 8/1969 | Lingle | 242/225 |
| 3,512,729 | A * | 5/1970 | Miller | 242/225 |
| 3,697,011 | A * | 10/1972 | Christensen et al. | 242/225 |
| 3,719,331 | A * | 3/1973 | Harsch | 43/43.12 |
| 3,747,881 | A * | 7/1973 | Akamu | 43/21 |
| 3,881,269 | A * | 5/1975 | Timmons | 43/21.2 |
| 3,932,954 | A * | 1/1976 | Wyroski | 43/21 |
| 4,004,366 | A * | 1/1977 | Berry | 43/27.4 |
| 4,021,003 | A * | 5/1977 | Watkins | 242/250 |
| 4,244,132 | A * | 1/1981 | Hoffman et al. | 43/21.2 |
| 4,283,025 | A * | 8/1981 | Whisenhunt | 43/21 |
| 4,376,350 | A * | 3/1983 | Bednarz et al. | 43/27.4 |
| 4,515,324 | A * | 5/1985 | Barton | 43/21 |
| 4,598,878 | A * | 7/1986 | Steffan | 43/21 |
| 4,634,072 | A * | 1/1987 | Stealy | 43/21 |
| 4,645,167 | A * | 2/1987 | Hardwick | 43/21.2 |
| 4,731,947 | A * | 3/1988 | Hart et al. | 43/21.2 |
| 4,739,944 | A * | 4/1988 | Atwell | 242/225 |
| 4,831,763 | A * | 5/1989 | Alcorn | 43/21.2 |
| 5,004,181 | A * | 4/1991 | Fowles | 242/225 |
| 5,042,188 | A * | 8/1991 | Ho | 43/21 |
| 5,115,593 | A * | 5/1992 | Keough | 43/27.4 |
| 5,435,093 | A * | 7/1995 | Minorics et al. | 43/21.2 |
| 5,647,161 | A * | 7/1997 | Miller, Sr. | 43/21.2 |
| 5,778,592 | A * | 7/1998 | Malmberg | 43/21.2 |
| 5,937,564 | A * | 8/1999 | Perreault | 43/21.2 |
| 5,937,567 | A * | 8/1999 | Elkins | 43/21.2 |
| 5,992,081 | A * | 11/1999 | Elkins | 43/21.2 |
| 6,089,652 | A * | 7/2000 | Miller, Sr. | 43/21.2 |
| 6,449,895 | B1 * | 9/2002 | Zabihi | 43/21 |
| 6,497,067 | B1 * | 12/2002 | King | 43/21.2 |
| 6,634,134 | B1 * | 10/2003 | Nyquist | 43/21.2 |
| 6,684,558 | B1 * | 2/2004 | Gillespie | 43/27.4 |
| 7,073,740 | B2 * | 7/2006 | Westhoff | 43/21 |
| 7,146,763 | B1 * | 12/2006 | Stanton | 43/21.2 |
| 7,269,922 | B1 * | 9/2007 | Mack | 43/21 |

\* cited by examiner

*Primary Examiner*—Darren W Ark
(74) *Attorney, Agent, or Firm*—Waddey & Patterson, P.C.; Ryan D. Levy

(57) ABSTRACT

A fishing device for the disabled comprising a base component, a power component, and a fishing rod component, with the fishing device having a functionality controllable by an individual with disabilities.

21 Claims, 3 Drawing Sheets

FISHING DEVICE FOR THE DISABLED

This is a Utility Patent Application for an invention by Chuck Byrd, a citizen of the United States, residing at 4375 Old Medina Road, Medina, Tenn. 38355, who has invented a new and useful "Fishing Device for the Disabled."

BACKGROUND OF THE INVENTION

1. Technical Field

The present invention relates to an automatic fishing device useful for the sport of fishing. More particularly, the present invention relates to fishing equipment for a disabled individual so that a wider range of individuals may be able to enjoy the sport. The invention also includes the various components necessary so that an individual having disabilities can fish greater ease.

2. Background of the Art

Fishing may be considered one of the more ancient practices dating back beyond ten thousand years ago being primarily used as a means for survival. Today both recreational fishing and sport fishing comprise a large portion of present fishing with the most common form of recreational fishing completed with a rod, reel, line, hook, and a type of variety of bait. In the U.S. alone, there are well over 25 million anglers with fishing being well over a 35 billion dollar industry. As such, a variety of different improvements have been provided to fishing equipment to assist in providing greater pleasure while fishing.

For example, in Wyroski, U.S. Pat. No. 3,932,954, a fishing reel comprising a motorized spinner for retracting the line is described with the fishing reel also having to switch position for easy thumb control. Generally, the '954 patent provides a simple drive mechanism adapted to spinning reels and is constructed in such a way so that the motor does not interfere with the line while casting the bait. Furthermore, batteries are maintained within the fishing pole handle so as to provide a relatively compact design.

In Berry, (U.S. Pat. No. 4,004,366) an adjustably mounted power fishing reel is described for use with deep water fishing where quite often large weights are utilized to seat the fishing line and lure to the desired depth. The device of the '366 patent includes a mounting support attached to the boat and a horizontal bar spaced above the deck which may be pivotally mounted so that the bar can swing in a vertical arch. Furthermore, a motor is mounted near the reel and discloses a driving wheel engagement with a brake shoe mounted on the pole adjacent to the reel in the opposite rocking direction.

In U.S. Pat. No. 4,021,003, issued to Watkins, a power driven fishing reel is described which is compact, lightweight, and can be used in deep water fishing. Furthermore, the invention of the '003 patent can be adapted with little modification to existing reels and can be fully adjusted for proper functioning with the fishing equipment of choice.

Whisenhunt, U.S. Pat. No. 4,283,025, discloses a motorized attachment for a fishing reel which provides power to the reel in the same manner as a hand crank. Furthermore, the invention of the '025 patent may be permanently mounted to a reel and generally comprises an electric motor, driving through a one-way clutch to the shaft of the reel from which the crank handle has previously been removed.

Barton (U.S. Pat. No. 4,515,324) describes a battery powered fishing reel having a motor operably connected with the spool member of the reel for facilitating of the winding of the fishing line onto the spool while still allowing for the normal operation of the reel. Generally, the device of the '324 patent provides a handheld-type fishing rod comprising typical spool means connected to a motor so as to provide for greater ease in winding the line.

U.S. Pat. No. 4,598,878, issued to Steffan, discloses a motorized fishing reel which is extremely compact in structure, light in weight, and relatively inexpensive to manufacture. Furthermore, the invention of the '878 patent provides for multiple switches for controlling output gears which allow for a relatively compact design in making the motor to a fishing reel.

U.S. Pat. No. 4,784,346, also issued to Steffan, similarly discloses a motorized fishing reel including an electric motor assembly mounted having a circuit operated by control lever. Generally, the lever is described as extending between ends of the reel body and has a finger-engaging portion so that an individual may manipulate the motor to de-energize the motor or lock on an energized condition of the motor with the reel.

Unfortunately, many of the prior art motorized fishing reels, while providing for simpler and easier use, still do not allow for all individuals to participate in fishing. More specifically, the prior art fishing reels are not useful for individuals with varying types of disabilities, including severely debilitating disabilities as well as disabilities including either a loss of strength and/or motor coordination. Furthermore, prior art fishing reels are difficult to operate for disabled individuals having lost either a limb or a digit. Currently, there are over 50 million adults with disabilities living in the United States with over 30 million having a severe disability.

The automated fishing reels generally available do not include other components necessary so that an individual with a disability can enjoy and succeed at the sport of fishing. More specifically, the prior fishing devices require substantial strength and coordination to cast while also requiring manipulation of the rod controls by the user's thumbs and fingers. In individuals lacking strength, coordination, limbs or digits, fishing is considered a severely complicated and often prohibitive endeavor when limited to prior art fishing equipment. Furthermore, in instances where reels have been motorized, the prior art automated fishing reels are designed for applications such as deep-sea fishing wherein the motor is used to shorten the amount of time required to reel in the line or otherwise reduce the work required in completing such a task though does not make fishing any less complicated for a disabled individual.

What is desired, therefore, is a fishing apparatus which substantially eliminates the needs to manually reel in a fishing rod and reel while fishing while also being designed to assist individuals with a variety of different types of disabilities. Indeed, a combination of characteristics including an improved rod control coupled with an automatic reel have been found to be necessary for individuals with varying types of disabilities to enjoy the sport of fishing. Also desired is a fishing apparatus which may be utilized successfully by individuals with little to no upper body strength.

SUMMARY OF THE INVENTION

The present invention provides a fishing device which is uniquely capable of use by individuals with physical disabilities while still being able to actively fish. Generally and in reference to the present invention, a disabled individual is defined as an individual having a below average strength or coordination resulting difficulty in performing routine activities. Furthermore, a disabled individual may instead have some sort of loss of limb and/or finger or thumb which may result in difficulty in manipulating items. As such, fishing is often a difficult or even prohibitive task for disabled individuals.

The inventive fishing device exhibits an improved degree of user friendliness including simple controls and easy manipulation to provide a fishing device with characteristics not heretofore seen. In addition, the fishing device with its multiple devices and various configurations is suitable for use in a variety of different environments by a person having disabilities.

More particularly, the fishing device comprises three general sections including a base component, a power component, and a fishing rod component. A characteristic of the fishing device of the present invention is that the device is simple to manipulate by persons lacking physical strength as well as advanced motor skills. For such applications by a person with disabilities, the invention provides various control points so that manipulation is less difficult than prior art fishing devices. Otherwise stated, a user has various options of manipulating the fishing device so the user may fish with minimal effort, strength, or motor skills while successfully experiencing fishing.

The power component of the fishing device comprises an electric motor for the automatic operation of the reel through the manipulation of controls. Furthermore, the power component may also include other elements for the control of the fishing device. Additionally, in various embodiments, a gas cylinder may be utilized so as to assist in dissipating the stress a resisting fish may impart on the fishing device of the present invention.

Advantageously, the fishing device provides an individual with a disability the opportunity to fish as the fishing device requires minimal strength, motor skills, and manipulation for the operation of a fishing reel and rod.

An object of the invention, therefore, is a fishing device for the disabled having characteristics which enable individuals with varying disabilities to have the opportunity to fish.

Another object of the invention is a fishing device having a base component which may be firmly situated on the ground or which may be attached to a wheelchair, boat, or other device.

Still another object of the invention is a fishing device comprising a power system wherein a variety of different energy sources may be utilized for the operation of the fishing device.

Yet another object of the invention is a fishing device having controls which require minimal dexterity and/or strength while providing the experience of fishing.

These aspects and others that will become apparent to the artisan upon review of the following description can be accomplished by providing a fishing device for the disabled comprising three general sections including a base component, a power component, and a fishing rod component, wherein controls are easily accessible and operable by persons having varying degrees of disabilities. The inventive fishing device for the disabled advantageously utilizes a combination of electronics, weight distribution, and physics so that virtually anyone can operate the fishing apparatus and experience fishing.

DETAILED DESCRIPTION OF THE PREFERRED EMBODIMENTS

Figure 1:
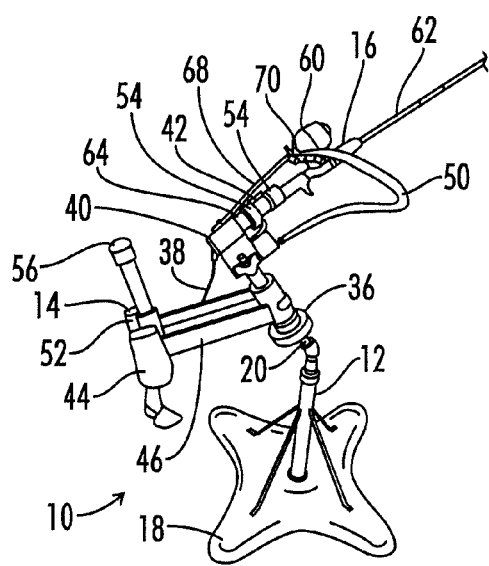
FIG. 1 is an illustration of an embodiment of the fishing device of the present invention.

Referring now to FIG. 1, there is at numeral 10, an embodiment of the fishing device of the present invention. Generally, the fishing device of the present invention may be described as including base component 12, power component 14, and fishing rod component 16. Fishing device 10 may be used in a variety of environments typical for fishing and may further include additional embodiments of fishing rods for differing types of fishing. Generally, these three components, base component 12, power component 14, and fishing rod component 16, comprise fishing device 10 in providing a device whereby a disabled individual will be able to fish.

Figure 2:
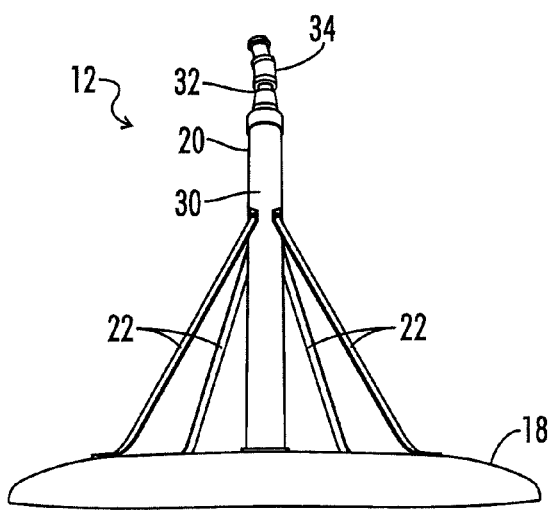
FIG. 2 is an illustration of a side view of an embodiment of the base component of the fishing device of the present invention.

Generally, base component 12 includes support base 18 for stabilizing fishing device 10 and linking element 20 which connects support base 18 of base component 12 to power component 14. More specifically, support base 18 may comprise a variety of embodiments with a preferable embodiment including a substantially flat design so that fishing device 10 may be adequately supported during use. FIG. 2 illustrate one embodiment of base component 10 having a substantially flat support base 18 attached to linking elements 20. Support base 18 may be comprised of a variety of different materials including plastics, polymers, thermoplastics, resins, metals, woods, and combinations thereof to provide a rigid platform for fishing device 10. Generally, linking element 20 attaches to the dorsal side of support base 18 in the configuration of fishing device 10. Linking element may include a variety of types of extensions or tubular members or may simply included the attachment of the power component to base component 10. Support gussets 22 may also be included in base component 12 wherein support gussets 22 may attach from a position on linking element 20 to a location on the dorsal surface of support base 18. Support gussets 22 provide for additional strength in the connection of linking element 20 to support base 18 in the design and utilization of fishing device 20. Support gussets 22 comprise an optional feature for providing additional strength and may include both metal attachments and/or plastic molding in comprising support gussets 22. Furthermore, support gussets 22 may be included in a plurality with a preferred embodiment including four support gussets. Yet furthermore, the number of support gusset may be included in greater or lesser numbers depending on the specific design of support base 18 of base component 12.

Figure 3:
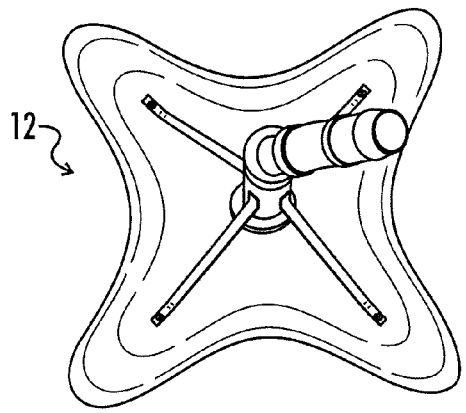
FIG. 3 is an illustration of a top view of an embodiment of the base component of the fishing device of the present invention.
Figure 4:
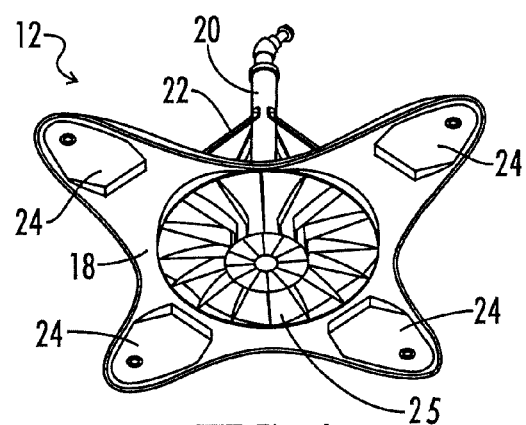
FIG. 4 is an illustration of a bottom view of an embodiment of the base component of the fishing device of the present invention.
Figure 5:
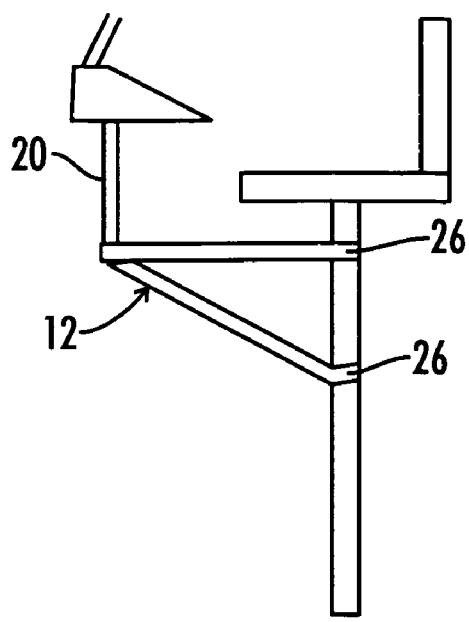
FIG. 5 is an illustration of a side view of an embodiment of the base component of the fishing device of the present invention attached to a seat post.

Referring now to FIG. 3, there is a top view of base component 12 of fishing device 10. Generally, base component 12 may include support base 18 in a variety of different shapes and/or sizes although support base 18 may be of from about 20 inches by 20 inches to about 30 inches by 30 inches. Depending on the size and application of fishing device 10, support base 18 may comprise a variety of different sizes to provide adequate stability to fishing device 10. Referring now to FIG. 4, there is a bottom view of base component 12 of fishing device 10. In various embodiments, support base 18 may comprise ribbing 25 to provide for an increased strength of support base 18. Preferably, ribbing 25 is formed during the molding process of support base 18 where support base 18 is molded from a plastic or polymer-type material. Additionally, support base 18 may further comprise weighted portions 24 in further providing stability for fishing device 10. In a preferable embodiment, weighted portions 24 are at four different corners of support base 18 though greater or lesser numbers of weighted elements 24 may be included in the fishing device of the present invention. In additional embodiments (not shown), weighted elements 24 may be absent. Generally, weighted elements 24 comprise a dense material and are either attached to the under surface of support base 18 or are molded into support base 18 to provide additional mass for the stability of fishing device 10. In certain embodiments, weighted elements 24 may be removable so that an individual may be able to attach the weighted elements upon assembly and use of fishing device 10.

In additional embodiments, fishing device 10 may comprise a completely different base component 12 wherein base component 12 comprises attachments 26 for attaching base component 12 to a variety of different items. These various embodiments of base element 12 may be utilized for attaching fishing device 10 to structures including but not limited to portions of a boat, seat posts, docks, wheelchairs, or a variety of different structures. As such, attachments 26 may comprise clamps wherein base component 12 is removably attachable to a post or other structure. In certain environments, the use of support base 18 may not be ideal as either an adequate surface for support base 18 to rest on is not available or the individual requires additional mobility, thus necessitating the use of an embodiment of base component 12 including attachments 26. In additional embodiments, attachments 26 may be designed to secure to the edge of a fishing boat.

The linking element of the fishing device is generally defined as the connection of the base component to the power component of the fishing device. In certain embodiments (not shown) the linking element may be extremely small, thus comprising a simple connection of the base component to the power component of the fishing device. In a preferable embodiment, linking element 20 comprises a tubular design and includes exterior tube 30 extending from the dorsal side of support base 18. Generally, exterior tube 30 may comprise a variety of different sizes with a preferable size of from about one (1) inch in diameter to about two (2) inches in diameter of a rigid material including plastics, polymers, PVCs, metals, and combinations thereof. In certain embodiments of base component 12 of fishing device 10, linking element 20 may include extendable portion 32 so that a user may adjust the height of the fishing device to correspond to the physical needs of the user as well the environment in which the fishing device will be utilized. Extendable portion 32 may comprise a slightly small diameter pipe which may lock or fit in various intervals within extended tube 30 so that a specific height of base component 12 may be achieved. A variety of different methods may be utilized to lock and extend the extendable portion 32 of linking element 20 out of exterior tube 30 including pins, locking fittings, screw arrangements or other devices known in the art to create an extendable element. While linking element 20 preferably includes a design for height adjustability, linking element 20 may also comprise exterior tube 30 without extendable portion 32 to provide a base component 12 with a fixed height so that this embodiment of fishing device 10 would maintain one fixed height.

Initial components of linking element 20 of base component 12 may include joint 34. In a preferable arrangement, joint 34 may comprise an elbow joint providing an offset so that a user may adjust the elevation of the fishing rod when used in combination with other components of the fishing device. More specifically, joint 34 may comprise an elbow joint having an angle of from about 0 degrees to about 90 degrees and more preferably of from about 20 degrees to about 90 degrees with the most preferable angle being approximately a 45 degree bend in joint 34. In other embodiments of fishing device 10, joint 34 may be absent and exterior tube 30 may be directly connected to the other components of fishing device 10.

A further component of fishing device 10 may include rotatable component 36 which may be positioned between linking component 20 and power component 14 as illustrated in FIG. 1 or may alternatively be positioned between power component 14 and fishing rod component 16 (not shown). Generally, rotatable component 36 provides for the rotation of fishing rod component 16 so that a user may rotate fishing rod component 16 to cast with fishing device 10. When preferably positioned between power component 14 and linking element 20 of base component 12, rotatable component 36 allows the user to rotate power component 14 with fishing rod component 16 in either a left or right direction so that a user can cast with the attached fishing rod. Preferably, rotatable component 36 provides for about a 360 degree capability for rotation, though may provide for a lesser rotation depending on the specific elements used to comprise rotatable component 36. Rotatable component 36 may comprise bearings within a flanged bearing housing which provides for about a 360 degree capacity for rotation. In more preferable embodiments, rotatable component 36 comprises a caster which may be adjusted to determine the amount of rotation for the fishing device. This adjustable rotation may be used to set casting for the fishing device which may result in a casting at a specific location. For example, by rotating the rod portion of the fishing device via the rotatable caster in the rearward direction and then forward, with the fishing device stopping rotating as a specific point, a user can cast to a specific direction.

In further embodiments not illustrated, rotatable component 36 may be included between power component 14 and fishing rod component 16 wherein power component 14 and base component 12 remain in a relatively fixed arrangement and the user rotates fishing rod component 16 relative to base component 12 and power component 14. Furthermore, while bearings are a preferable element of rotatable component 36, other styles of rotatable elements may be included for rotatable component 36 to provide for a range of motion adequate for casting with the fishing device.

Figure 6:
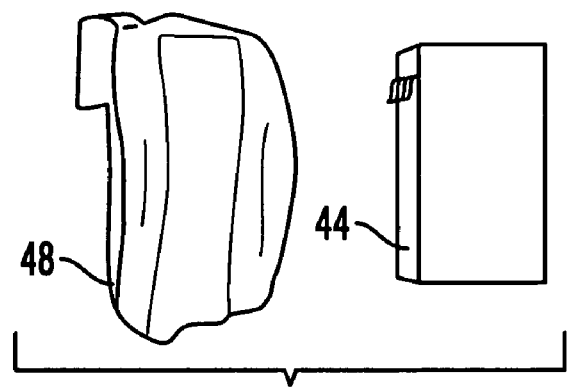
FIG. 6 is an illustration of an embodiment of a power source for the fishing device of the present invention.

Power component 14 may include electrical connector 38 for connecting to a power source, motor 40, switch 42 and housing 46. Additionally, power component 14 may also include power source 44 which preferably comprises a 12 volt portable battery as illustrated in FIG. 6. Specifically, power source 44 may comprise a 12 volt battery that may be attachable to housing 46 of power component 14 via battery container 48. In embodiments of fishing device 10 which include a 12 volt battery as power source 44, generally the 12 volt battery is sized to be convenient to the dimensions of the fishing device. The battery may have dimensions of from about 2 inches by 4 inches though may be larger or smaller depending upon the design configuration of fishing device 10 and the specific power requirements necessary for the fishing device. Additionally, battery container 48 may be utilized to hold the battery and may attach to housing 46 of power component 14.

In embodiments of fishing device 10 with a portably battery attached to fishing device 10, electrical connector 38 connects from the battery to motor 40 to provide the necessary power to motor 40 for the functioning of fishing device 10.

In certain situations, a portable battery may not be available or other power sources may be more preferable for use with fishing device 10. As such, the power source may be a variety of different power sources including full sized car batteries, wheel chair batteries, fishing boat batteries, or other batteries. Advantageously, electrical connector 38 may connect to a variety of different types of batteries so that a preferable power source 44 may be utilized. In certain embodiments of fishing device 10 (not shown), fishing device 10 may attach to an electric wheel chair. Fishing device 10 may be powered by the same battery utilized to power the wheelchair as electrical component 38 may be connected to the battery of the wheelchair so that fishing device 10 is also powered. Similarly, electrical connector 38 may also be connected to the battery of a fishing boat for powering fishing device 10 and thus may preclude the necessity including a portable battery with fishing device 10. Yet furthermore, in certain instances where the user may be fishing for an extended duration, an individual may provide a full size 12 volt battery such as a car battery for use in conjunction with fishing device 10 so that fishing device 10 may be operated longer prior to having to replace or recharge the power source.

In yet further embodiments not illustrated, electrical connector 38 may also comprise a connection for an AC electrical socket so that fishing device 10 may be plugged in similar to any household appliance. This style of electrical connector 38 may be useful when fishing from a dock having electrical outlets and furthermore, provides for an individual to practice with fishing device 10 indoors without depleting a battery.

Motor 40 of power component 14 may generally comprises a 12 volt DC motor. Motor 40 may include a cover such as a waterproof injection molded capsule for providing protection from various environmental conditions while fishing. Motor 40 includes connection to electrical connector 36 to receive power from a power source and furthermore, is connected to driveshaft 50. Generally, motor 40 comprises a motor capable of functioning at various speeds, acceleration rates and directions for operating fishing device 10 in a preferred manner. Advantageously, the rate of speed of the motor can be controlled which may translate to the lure or bait being moved through the water at a specific depth. As fishing often requires the lure or bait to travel at precise depths through the water to encourage fish to bite, the use of a variable speed motor for the present invention can allow an individual to fish at an ideal depth with ease.

Power component 14 of fishing device 10 may also include electronic controller 52 in connection with motor 40 for providing variable speed capabilities and acceleration rates. Additionally, electronic controller 52 may also comprise an accelerator compensator so that fishing device 10 may provide a rapid response to the movement and stresses on fishing device 10 resulting from a caught fish. Otherwise stated, the controller may provide for compensation when a fish fights, both pulling away and toward the fishing device. Resistance may be increased while the fish is pulling away, and subsequently decreased when the fish stops struggling, thus maintaining the reeling in of the fish at a more constant rate. In further embodiments, electronic controller 52 may include programmable capabilities so that specific speeds and accelerations may be utilized with motor 40.

Figure 7:
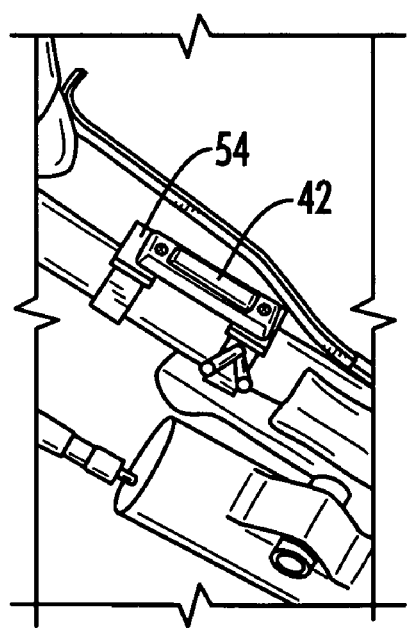
FIG. 7 is an illustration of a close-up view of an embodiment of a switch for the fishing device of the present invention.
Figure 8:
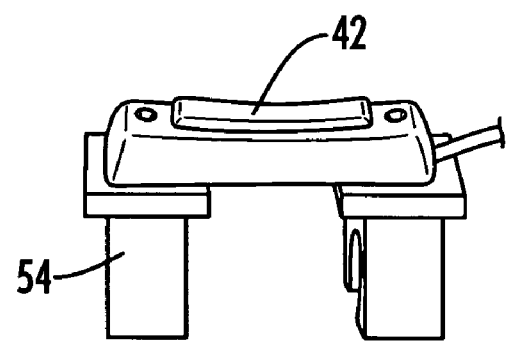
FIG. 8 is an illustration of a view of an embodiment of a switch housing for the fishing device of the present invention.

Power component 12 additionally comprises switch 42 for manipulation by the user to engage the motor in operating fishing device 10. As illustrated in FIG. 7, switch 42 may comprise a push button switch for activating motor 40. As will be subsequently discussed, the activation of motor 40 provides for the reeling in of fishing line to fishing rod component 16 of fishing device 10. Additionally, switch 42 may be mounted by switch mount 54 to various locations on fishing device 10, with FIG. 8 illustrating one possible embodiment of switch mount 54. Preferably, switch 42 with mount 54 is located on the fishing rod with connections extending from the switch for operation of motor 40. Generally, switch 42 may be mounted on multiple aspects of the rod and device so that the user may have greatest ease in accessing switch for controlling fishing device 10. A variety of different switches may be utilized in various in embodiments of fishing device 10 of the present invention. Additional switch options include a foot pedal control, a remote control, a sip and puff switch, photo sensors, a whisker switch, a motion detector device, fiber optic connections as well as a voice activated switch. Furthermore, combinations of the above switches may be utilized as well as additional switch types which may be manipulated by individuals having a disability. In further embodiments, the switch may comprise a programmable switch so that fishing device 10 automatically reels the line in, in a predetermined manner. Typically the selection of the type of switch will be determined specifically based upon the disabilities of the individual for which the fishing device is intended.

An additional component of fishing device 10 may include post 56 for the user to grasp or push while rotating fishing rod component 16 relative to base component 12 by rotatable component 36. As illustrated in FIG. 1 where rotatable component 36 is located between linking element 20 and power component 14, post 56 may be attached to power component 14 distally from the connection to fishing rod component 16 so that the user may grasp or push post 56 and rotate fishing rod component 16 for casting. In further embodiments (not shown) wherein rotatable component 36 is situated between power component 14 and fishing rod component 16, post 56 may be attached to fishing rod component 16 distally from the tip of the fishing rod. Regardless of the position of post 56, post 56 provides for individuals with the lack of hand and arm strength a leverage point for casting off of the fishing device so that a user may successfully cast. Furthermore, individuals lacking a hand, forearm, or fingers can still cast the fishing device of the present invention by simply pushing post 56 of fishing device 10 backwards then forwards to generate energy and cast the bait or lure. Additionally, post 56 may be weighted and/or specifically located to counter balance the fishing rod component of the fishing device. Generally, in a preferred embodiment, weights may be added to post 56 so that the weight of post 56 may altered to counter balance a variety of fishing rods having different lengths and weights. Yet furthermore, weights may also be added or removed depending on the size and type of bait utilized with the fishing device. When utilized in conjunction with the rotatable connection as previously discussed, a disabled user may cast a significant distance while casting quite accurately.

Figure 9:
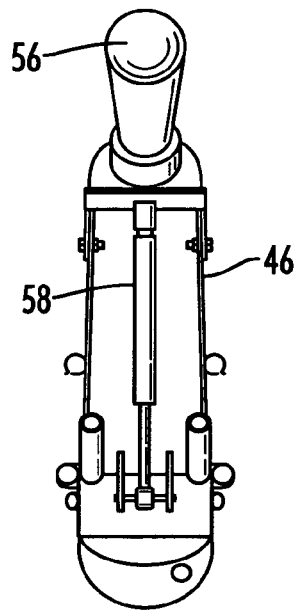
FIG. 9 is an illustration of a top view of an embodiment of an energy absorber for the fishing device of the present invention with the fishing rod component and portions of the power component removed.

The fishing device of the present invention may also provide for the capability to absorb energy resulting from the pull or struggle of a caught fish or other object. Otherwise stated, the energy absorber reduces the perceived stress imparted on a user from a caught fish. Referring now to FIG. 9, there is a top view illustration of energy absorber 58 of the present invention with portions of power component 14 removed as well as fishing rod component 16. Generally energy absorber 58 functions to provide resistance against a fish pulling on fishing line from the rod and reel of fishing rod component 16. When significant tension is placed upon fishing rod component 16, the energy absorber 58 will assist in dissipating the perceived stress by either compressing or extending. In a preferable arrangement, energy absorber 58 comprises a gas cylinder such as a nitrogen charged gas cylinder. More specifically, the charged gas cylinder, as energy absorber 58, may include adjustable resistance settings relative to the size and type of fish for which the fishing device is used. Generally, the gas cylinder comprises an extendable design, thus providing resistance upon the compression of the gas cylinder.

In providing energy absorber 58 as a gas cylinder the gas cylinder may include adjustability including settings up to about 10 pounds to about 200 pounds corresponding to the resistance capabilities of the cylinder for different types and sizes of fish. In further embodiments, energy absorber 58 may comprise other compressible elements including polymers as well as compressible liquids for dissipating tension placed upon fishing rod 16. Other embodiments of energy absorber 58 may include springs, shock absorbers and electrical shock absorbing devices. With energy absorber 58, a disabled user having relatively little strength and coordination can still reel in and negotiate a struggling fish as energy absorber 58 helps offset the stress translated to the user during the process of reeling in the fish. In additional embodiments where the user may be disabled but maintain strength or in situations where the fishing device will only be used for small fish, energy absorber 58 may be eliminated from the design of fishing device 10.

Fishing rod component 16 of fishing device 10 generally comprises reel 60 and rod 62 with rod 62 attached to fishing device 10 by rod connector 64. Furthermore, driveshaft 50 may physically connect motor 40 and reel 60. More specifically, driveshaft 50 may preferably comprise a bi-directional rotary driveshaft cable. Generally, the bi-directional aspect of driveshaft 50 is desirable so that reel 60 may be operated in both a clockwise and counter-clockwise rotational fashion.

Reel 60 may comprise a variety of different types of reels known in the art for the collection of fishing line. In preferable embodiments, reel 60 may comprise a reel having a standard crank handle. In such an embodiment, driveshaft 50 may connect directly to the existing crank handle 66 of the reel and would thereby provide the necessary rotational force for reeling in fishing line. In further embodiments, other designs of reel 60 may be utilized wherein driveshaft 50 connects internally within reel 60 for the operation of the reel. Additionally, multiple types of automatic reels may be utilized in conjunction with the fishing device of the present invention.

Figure 10:
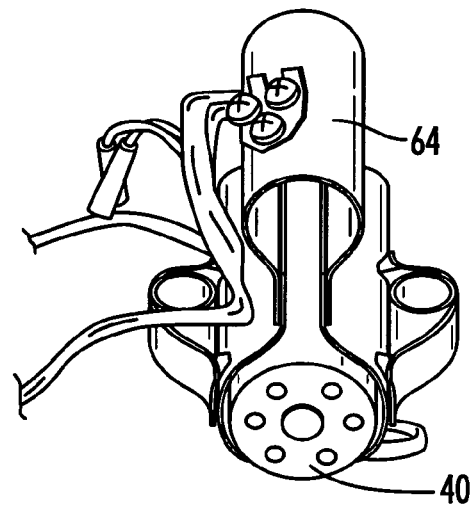
FIG. 10 is an illustration of a view of an embodiment of a rod connector for the fishing device of the present invention.

Generally, reel 60 is attached to the dorsal side of rod 62 with the heel of rod 62 connected to fishing device 10 by rod connector 64. Rod connector 64 as illustrated in FIG. 10 may receive a variety of differently sized rods within rod connector 64. As such, a user may utilize a variety of different types of fishing rods including rods having different lengths and widths in conjunction with the fishing device of the present invention. Furthermore, rod 64 may include a variety of fittings including set screws, clamps, and pins as well as other devices to adequately secure different size rods to fishing device 10. In preferable embodiments, fishing device 10 includes motor 40 of power component 12 beneath rod connector 64 which maintains the heel of rod 62. Advantageously, this arrangement may provide users the capacity to create a lateral adjustment in finding a balance for the fishing device.

Figure 11:
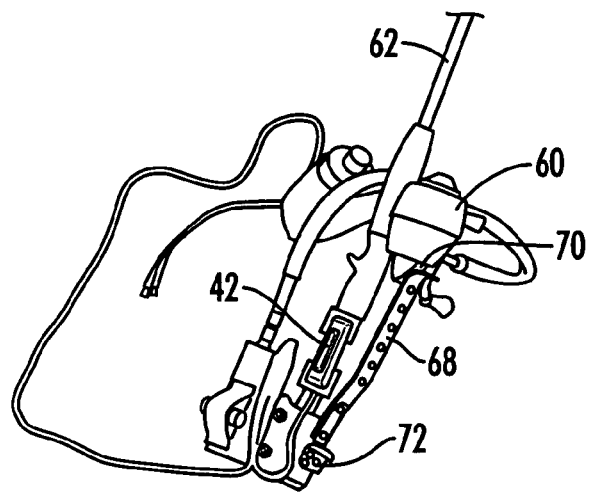
FIG. 11 is an illustration of a view of an embodiment of a leverage bar for the fishing device of the present invention.

Optionally, fishing device 10 may comprise leverage bar 68 for operation of fishing reel 60. In a preferred embodiment, fishing reel 60 comprises release plunger 70 for precluding the rotation of the inner portions of the reel. Typically, release plunger 70 is depressed during the majority of a casting motion and released at the point where the user desires the fishing line to extend from the fishing rod. Leverage bar 68 provides for a much easier engagement of release plunger 70 where individuals can engage release leverage bar 68 by applying downward pressure and subsequently releasing leverage bar 68 and release plunger 70 at the desired direction for fishing. Otherwise stated, leverage bar 68 provides an easier way for individuals having lesser coordination and strength to manipulate release plunger 70. Individuals lacking a thumb may also be able to operate the release plunger of the present invention as a thumbless user could still grasp and apply pressure to the leverage bar of the present invention whereas the same disabled individual would experience great difficulty in using a standard plunger of a fishing rod without a leverage bar. More specifically as illustrated in FIG. 11, leverage bar 68 may include flexible mount 72 distal to the end of leverage bar 68 in engagement with release plunger 70. Preferably, flexible mount 72 comprises a hinge mounted to the distal end of the lever bar so that a user may compress leverage bar 68 through a variety of different methods and thus move leverage bar 68 the required distance to activate release plunger 70. In additional embodiments, lever bar 68 may include a variety of different holes, grips, edgings or other surface characteristics so that leverage bar 68 may be easy to grasp or push by individuals having little strength or lacking thumbs or fingers.

In operating fishing device 10 of the present invention, fishing device 10 may be secured either by support base 18 on the ground surface or through the use of clamps 28 to a structure to stabilize fishing device 10. Subsequently, a user may depress leverage bar 68 to engage release plunger 70 in preparation for casting. A user may then grasp or push post 56 to rotate fishing rod component 16 relative to base component 12 away from the direction the user intends to cast. The user may then rotate fishing rod component 16 in the opposite direction by control of post 56 with the user releasing leverage bar 68 at the desired direction to be fished. In further embodiments, an adjustable caster may used to preferably limit the forward rotation for directing the casting of the device. When the user desires to reel in the extended fishing line, the user may depress switch 42 to activate motor 40 which operates reel 60 by driveshaft 50.

Figure 12:
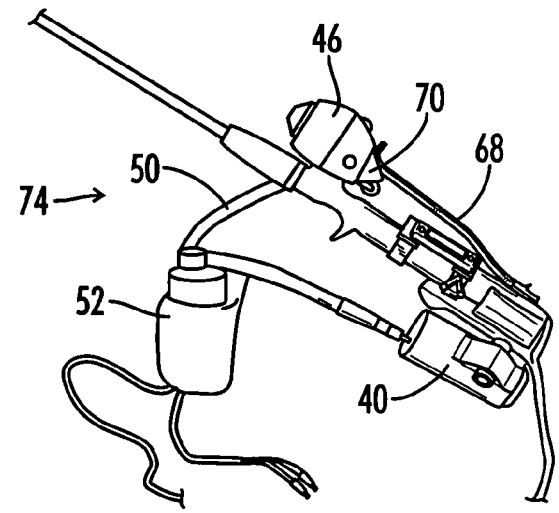
FIG. 12 is an illustration of a view of an embodiment of a mobile fishing device of the present invention.

In an additional embodiment of the invention, fishing device 10 may comprise a mobile arrangement 74 wherein base component 12 is completely eliminated from mobile arrangement 74 as illustrated in FIG. 12. Furthermore, mobile fishing arrangement 74 does not include energy absorber 58 or housing 46 as mobile arrangement 74 is designed for disabled users having sufficient dexterity and strength to operate mobile fishing arrangement 74 without the need of a base. Furthermore, mobile fishing arrangement 74 may be much easier to use for bank fishing where both a stable surface and a suitable attachment point may be likely unavailable. For such an embodiment, the power source may be included in a configuration to be worn on a belt so that a user would only have to carry fishing rod component 16 with the portions of power component 14. Advantageously, mobile fishing arrangement 74 may still function to assist in depressing release plunger 70 as lever bar 68 may be included and furthermore, would operate reel 60 to retract extended fishing line by motor 40.

Accordingly, by the practice of the present invention, a fishing device having heretofore unrecognized characteristics is disclosed. The provided embodiments of the fishing device of the present invention provide for a disabled user the capability to fish.

The disclosures of all cited patents and publications referred to in this application are incorporated herein by reference.

The above description is intended to enable the person skilled in the art to practice the invention. It is not intended to detail all of the possible variations and modifications that would become apparent to the skilled worker upon reading the description. It is intended however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A fishing device comprising:
   a base component including
      a support base for stabilizing the fishing device having a ventral side and a dorsal side for stabilizing the fishing device;
      a linking element connected to the support base, the linking element having a first end and a second end;
   a power component having a frame attached to the linking element with the power component including
      an electrical connector for connecting to a power source;
      a motor in connection with the electrical connector;
      a switch for engaging the motor;
   a fishing rod component in communication with the power component with the fishing rod component including
      a reel with a drive shaft connecting the reel to the motor; and
      a rod with a heel end attached to the power component;
   a rotatable component in communication with the fishing rod component;
      the fishing rod component rotatable relative to the base component
      the first end of the linking element connected at the dorsal side of the support base and the second end of the linking element connected at the rotatable component; and
   a post in communication with the fishing rod component and offset from the rotatable component;
      the post rotatable with the fishing rod component relative to the base component.

2. The fishing device of claim 1 wherein the support base comprises a base having a substantially flat ventral surface and the linking element connected to a dorsal surface.

3. The fishing device of claim 1 wherein the linking element comprises a support tube.

4. The fishing device of claim 3 wherein the support tube comprises an adjustable height support tube.

5. The fishing device of claim 1 further comprising the rotatable component attached to the power component for providing rotation of the fishing rod component relative to the base component.

6. The fishing device of claim 1 wherein the rotatable component comprises a housing and bearings for rotating the fishing component at least about 45 degrees relative to the base component.

7. The fishing device of claim 1 wherein the post is attached to the power component.

8. The fishing device of claim 1 wherein the power source comprises a battery removably attached to the frame of the power component.

9. The fishing device of claim 1 wherein the power source comprises a power source selected from the group consisting of a 12 volt battery; a wheelchair battery; a fishing boat battery; a car battery; AC electricity and combinations thereof.

10. The fishing device of claim 1 wherein the power component further comprises an energy absorber for lessening perceived stress for the user.

11. The fishing device of claim 10 wherein the energy absorber comprises a gas cylinder.

12. The fishing device of claim 10 wherein the energy absorber is selected from the group consisting of polymers, compressible liquids, springs, shock absorbers, electrical shock absorbing devices and combinations thereof.

13. The fishing device of claim 1 wherein the power component further comprises an electronic controller for controlling performance characteristics of the motor.

14. The fishing device of claim 13 wherein the electronic controller comprises a programmable electronic control.

15. The fishing device of claim 1 wherein the motor comprises a 12 volt DC motor attachable to the heel of the rod.

16. The fishing device of claim 1 wherein the drive shaft comprises a flexible drive shaft connected to the motor and to the reel.

17. The fishing device of claim 1 wherein the reel further comprises a release plunger and a leverage bar with the leverage bar in physical communication with the release plunger.

18. The fishing device of claim 1 wherein the switch comprises a push-button switch.

19. The fishing device of claim 1 wherein the switch is selected from the group consisting of a remote control; sip and puff switch; light activated switch; whisker switch; motion detector; fiber optic switch; infrared switch; voice activated switch and combinations thereof.

20. The fishing device of claim 1 wherein the switch comprises a programmable switch for casting and automatically fishing.

21. A fishing device comprising:
   a base component including
      a support base having a ventral side and a dorsal side for stabilizing the fishing device;

a linking element attached to the dorsal side of the support base, the linking element having a first end and a second end;

a power component having a frame with the power component including
- an electrical connector for connecting to a power source;
- a motor in connection with the electrical connector;
- a switch for engaging the motor;
- an electrical controller for controlling performance characteristics of the motor;
- an energy absorber for lessening perceived stress for the user;

a fishing rod component in communication with the power component including
- a reel with release plunger and a drive shaft connecting the reel to the motor; and
- a rod having a heel and a rod tip with the reel connected to the rod;
- a leverage bar in physical contact with the release plunger for engaging the release plunger;

a rotatable component for rotating the fishing rod component at least about 45 degrees relative to the base component with the rotatable component connected to the linking element and the power component;
- the first end of linking element connected at the dorsal side of the support base and the second end of the linking element connected at the rotatable component; and a post in communication with the fishing component and offset from the rotatable component;
- the post and fishing component rotating together relative to the base component.

* * * * *